Patented July 1, 1941

2,248,021

UNITED STATES PATENT OFFICE 2,248,021

CERAMIC COLORING AGENT

Charles G. Geary, Perth Amboy, N. J., assignor to E. I. du Pont de Nemours & Company, Wilmington, Del., a corporation of Delaware No Drawing. Application July 29, 1938, Serial No. 222,065

9 Claims. (Cl. 106—302)

This invention relates to a method for preparing an improved ceramic pigment and to the novel ceramic pigment thus prepared. More specifically, it relates to an improved copper-chrome black ceramic pigment adapted to impart a black or gray color to vitreous enamels used for decorating glassware, other ceramic articles, or metals. The invention is more especially concerned with an improved copper-chrome black ceramic pigment which, because of its stability at high temperatures, is especially valuable for use in coloring vitreous enamel compositions intended for application to metals generally and to sheet metal surfaces particularly, which enamels are ordinarily subjected to prolonged heating.

Present day black pigments of the type utilized for coloring enamels generally contain the oxides or cobalt, iron and chromium. Although black ceramic pigments consisting essentially of the oxides of copper and chromium are now known to the art, these pigments have generally been unsatisfactory because they lack a sufficient degree of blackness or neutrality of hue, coupled with poor stability during heating and a tendency to turn green upon prolonged heating when present in vitreous enamels. These defects have prevented widespread use of the copper-chrome pigments now known to the ceramic industry. Moreover, difficulties of manufacture and, more especially, difficulties of reproducing the same pigment in different successive batches, has greatly restricted the extent to which copper-chrome pigments have previously been employed in the industry.

This invention has for an object the preparation of an improved copper-chrome black pigment, by an improved method of manufacture, which pigment is reproducible to yield a substantially uniform product over a wide range of firing temperatures. Another object of this invention is the preparation of an improved copper-chrome pigment, adapted for imparting a black or gray color to vitreous enamels, which pigment will be free from the defects previously encountered which are inherent in the best pigments of the copper-chrome type now known to the art. These and still other objects of this invention will be apparent from the ensuing disclosure of my improved black ceramic pigment of the copper-chrome type and its method of manufacture.

I have discovered that an improved black ceramic pigment of the copper-chrome type, which pigment is open to none of the objections now characteristic of pigments of this type utilized by the ceramic industry, may be prepared by precipitating a copper chromate of substantially normal composition, adding to this compound additional chromium, preferably in the form of chromic oxide or chromic anhydride, until the chromium-to-copper molecular ratio is such as to yield a molar ratio falling within the range 1.5:1 to 2.5:1 in the finished pigment, and then calcining the product. In addition to chromic oxide and chromic anhydride, various other sources of the additional chromium may be utilized such as alkali metal dichromates or various metal chromates. As these are not entirely equivalent to chromic oxide or chromic anhydride in the preparation of my improved pigments, however, their utilization is not preferred.

I have also found that copper-chrome blacks of the improved type described may be still further improved in tinctorial power by the inclusion in the batch of approximately 5% of manganese dioxide. The presence of manganese dioxide in amounts up to 5% by weight, based on the total weight of the composition, tends to make the black less bluish and more brownish in color, as well as to increase its coloring ability. However, my improved copper-chrome blacks need not contain manganese dioxide and are readily utilizable without such addition wherever a black coloring ceramic oxide may be employed.

As examples of my new improved copper-chrome ceramic coloring pigments and methods by which they may be manufactured the following may be given. It may be stated that the general method involves first the production of a substantially normal copper chromate by precipitation and then admixture of this precipitated product with additional quantities of chromium compounds as previously specified, preferably chromic oxide or chromic anhydride. Manganese dioxide should then be added, if the addition of manganese dioxide is decided upon. The mixture is then calcined and the resulting product is the improved pigment.

Example 1

This example is concerned with the preparation of substantially normal copper chromate.

A solution containing 200 grams of blue vitriol (copper sulfate) and 120 grams of potassium dichromate ($K_2Cr_2O_7$) in 800 cc. of hot water is prepared. To this solution is slowly added a solution containing 80 grams of soda ash ($Na_2CO_3$) in 400 cc. of hot water. The addition is made with stirring, and care is taken to prevent frothing.

When precipitation is complete the reddish brown precipitate is permitted to settle and then washed by decantation until the wash water is free from sulfates. The yield, after filtering and drying, is substantially theoretical in amount. Some sulfate may be included, presumably occluded in the precipitate, and the product may contain some quantities of water of constitution. This normal copper chromate is the starting material from which my improved pigment may be prepared.

*Example 2*

Another method by which normal copper chromate may be prepared may be described as follows:

220 grams of malachite (copper carbonate) and 298 grams of sodium dischromate are mixed together and dissolved in 500 cc. of hot water. The solution is heated until the reaction starts, whereupon heating is continued, accompanied by the addition of approximately 750 cc. of additional water until the reaction is substantially complete. The precipitate, which is reddish yellow brown in color, is washed until free from sulfates or, if desired, it may be employed without washing. This material may be taken as the starting material in the preparation of my improved ceramic pigments as described in the following examples and elsewhere in this description.

*Example 3*

To 68 grams of copper chromate, prepared as described in Example 1, there is added 32 grams of dried and powdered chromic anhydride ($CrO_3$). The batch is thoroughly mixed on a glass slab and is then calcined for one hour at a temperature of 800° C. The resulting calcined product is a soft black powder and contains some soluble chromium. It is milled with water for a short while, and is then washed until the wash water is substantially colorless and gives no test for sulfates. It may then be utilized directly as a black ceramic pigment.

*Example 4*

To 70 grams of copper chromate, prepared as in Example 1, there is added 30 grams of chromic oxide ($Cr_2O_3$). The batch is thoroughly mixed and is then calcined for one hour at 800° C. The calcined product is a soft black powder which, after milling and washing as described in Example 3, is suitable directly for use as a black ceramic pigment.

*Example 5*

To 100 grams of copper chromate, prepared as in Example 2 but not washed, there is added 50 grams of dry powdered chromic anhydride ($CrO_3$). The batch is then milled on a glass slab until the mixture is substantially uniform throughout. This is then calcined for one hour at a temperature of 700° C. The resulting black powder is slightly sintered and has a slight gray cast. However, after milling and washing as described in Example 3, the product is a black ceramic pigment of satisfactory intensity.

*Example 6*

To a mixture of 68 grams of copper chromate prepared as in Example 1, and 32 grams of chromic anhydride ($CrO_3$), there is added 5 grams of manganese dioxide ($MnO_2$). The batch is milled on a glass slab until thorough mixing occurs. It is then calcined for one hour at a temperature of 700° C. The product is then milled for a short time with water and washed. A black ceramic pigment of satisfactory intensity results.

The foregoing examples are to be considered as generally indicative of the general method by which my improved black pigments may be manufactured. Other soluble salts of copper may be employed, together with soluble chromates or dichromates, or chromic acids and an alkali, in the preparation of the normal copper chromate. The normal copper chromate, utilized as a starting material in the manufacture of these improved pigments, may, for example, be prepared by dissolving cuprous or cupric oxide in solutions of chromic acid or metal dichromates, followed by neutralization of the solution. Copper carbonate is a particularly suitable source of copper in the preparation of normal copper chromates, and I have obtained high yields of normal copper chromate from copper carbonate by treating it with soluble metal dichromates.

Prior to calcination the additional content of chromium is most advantageously supplied by chromic oxide or chromic anhydride. However, these chromium compounds may be replaced in whole or in part by other sources of chromium such as potassium or sodium dichromates. As previously stated I do not prefer to use metal dichromates or chromates instead of chromic oxide or chromic anhydride, however, as they are but partial equivalents of the latter chromium compounds. Where manganese dioxide is included as one of the ingredients of the pigment prior to calcination the chrome is best added in the form of chromic anhydride. The calcined powder is very soft, unless alkali is present in the calcine, and may be employed after only sufficient milling to permit the washing out of the soluble chromium compounds present. The strength of the pigment may be slightly increased by milling to optimum fineness before washing.

It is believed that the essential source of the coloring power of these black pigments is a definite chemical compound resulting from the calcination of a copper dichromate or equivalent composition in which all or a part of the chromium is chemically combined with all of the copper previous to calcination. Such a composition will produce a satisfactory black ceramic pigment having the improved properties characteristic of my improved pigments, when calcined for one hour at a temperature between 700 and 900° C. However, the molar ratio of chromium to copper, which may advantageously be a 2:1 ratio, may vary within the limits previously given, i. e. 1.5:1 to the ratio of 2.5:1. This is a molar ratio, i. e. the ratio of the number of mols of chromium associated with each mol of copper in my calcine. Within these limits it will be found that a batch low in chromium will tend to show greater variation in the finished pigment with variations in the calcination temperature, while batches high in chromium will tend to produce pigments imparting more of a greenish cast to vitreous enamels and tending to become greener on prolonged firing of the enamels. The amount of chromium combined with copper previous to calcination may be as low as one mol of chromium to three of copper, provided sufficient chromium is added during or prior to calcination to bring the molar ratio of chromium to copper within the limits previously given.

In general it will be found most advantageous to precipitate a normal copper chromate of approximately one mol copper to one mol chromium ratio and to utilize this as the starting material in preparing my improved pigments. The amount of chromium added prior to or during calcination should preferably be such that the ultimate composition approaches that having a ratio of two mols of chromium to one of copper. Under these conditions the time of calcination is preferably extended to that sufficient to produce the optimum intensity in the black pigment. Black pigments produced as above described are inexpensive in cost as compared with typical cobalt blacks now utilized as ceramic pigments. In addition, the improved copper-chrome black ceramic pigment is less brownish in cast and is fully as intense in hue and tinctorial power as most of the ceramic oxides now utilized.

In accordance with the usual practice, it is customary in utilizing black pigments to impart a black color to vitreous enamels where those enamels are intended for application to cast iron or sheet steel, to mill the pigment with the vitreous enamel or frit in water with sufficient clay and electrolyte to keep the mixture or slip in suspension. This slip is then sprayed on the surface of the ware to be enameled, dried, and subjected to firing at a temperature high enough to cause the enamel to fuse or gloss over. In enameling cast iron ware it is customary to employ substantially 6% of the coloring oxide in an opaque frit and to fire the composition from 10 to 20 minutes at a temperature of 680 to 700° C. These frits may contain lead, but are more generally free from lead compounds. In enameling sheet steel it is more customary to utilize a blue frit containing cobalt oxide melted into the frit. The amount of black pigment employed is then approximately 3% by weight. These frits are usually free from lead compounds and are usually fired for from 3 to 6 minutes at a temperature of 810 to 840° C.

I am aware that numerous details of the process as previously described and various details of my improved ceramic pigments may be varied throughout a wide range without departing from the principles of this invention. It is therefore my desire that the invention be not restricted to the details which have been given merely as illustrative, except as necessitated by the prior art and appended claims. Wherever in these appended claims a black ceramic pigment is referred to, it is my intention to include pigments which may be used for imparting colors other than black (such for example as gray) to the vitreous compositions in which it is incorporated.

I claim:

1. A process for preparing a black ceramic pigment which comprises adding to normal copper chromate additional chromium in amount sufficient to insure a chromium to copper molecular ratio in the finished pigment which falls within the range 1.5:1 to 2.5:1, and calcining the resulting mixture.

2. A process for preparing a black ceramic pigment which comprises adding to normal copper chromate sufficient additional chromium in the form of a chromium compound selected from the group which consists of chromic anhydride and chromic oxide to insure a chromium to copper molecular ratio in the finished pigment falling within the range 1.5:1 to 2.5:1, and calcining the mixture.

3. A process for preparing a black ceramic pigment which comprises adding to copper chromate of substantially normal composition sufficient additional chromium, in the form of a compound of chromium selected from the group which consists of chromic anhydride and chromic oxide, to insure a chromium to copper molecular ratio in the finished pigment of substantially 2:1, and then calcining said mixture.

4. A process for preparing a black ceramic pigment which comprises adding to copper chromate of substantially normal composition a sufficient amount of a compound of chromium to insure a molecular ratio of chromium to copper falling within the range 1.5:1 to 2.5:1, adding manganese dioxide thereto, and then calcining said mixture.

5. A process for preparing a black ceramic pigment which comprises adding to copper chromate of substantially normal composition manganese dioxide and sufficient of a chromium compound selected from the group which consists of chromic anhydride and chromic oxide to insure a chromium to copper molecular ratio falling within the range of molar ratios 1.5:1 to 2.5:1 in the calcined pigment, and then calcining said mixture.

6. A process for preparing a black ceramic pigment which comprises adding to copper chromate of substantially normal composition a compound of chromium selected from the group which consists of chromic anhydride and chromic oxide in amounts sufficient to insure a chromium to copper molecular ratio in the finished product falling within the range 1.5:1 to 2.5:1, adding thereto sufficient manganese dioxide to constitute substantially 5% by weight of the total composition, and calcining said mixture at a temperature within the range 700 to 900° C.

7. A black ceramic pigment consisting essentially of a compound of copper and chromium having a chromium to copper molecular ratio falling within the range 1.5:1 to 2.5:1.

8. A black ceramic pigment consisting essentially of a compound of copper and chromium, and containing, in addition, manganese.

9. The black ceramic pigment prepared in accordance with the process of claim 1.

CHARLES G. GEARY.